(12) United States Patent
McLane

(10) Patent No.: US 8,530,790 B2
(45) Date of Patent: Sep. 10, 2013

(54) METHOD FOR EXTRACTING NON-METALLIC WELD METAL INCLUSIONS

(75) Inventor: John E. McLane, Rocky River, OH (US)

(73) Assignee: Lincoln Global, Inc., City of Industry, CA (US)

( * ) Notice: Subject to any disclaimer, the term of this patent is extended or adjusted under 35 U.S.C. 154(b) by 2522 days.

(21) Appl. No.: 11/224,348

(22) Filed: Sep. 12, 2005

(65) Prior Publication Data

US 2007/0057026 A1   Mar. 15, 2007

(51) Int. Cl.
B23K 9/23 (2006.01)
B23K 9/16 (2006.01)
B23K 9/173 (2006.01)

(52) U.S. Cl.
CPC ... *B23K 9/23* (2013.01); *B23K 9/16* (2013.01); *B23K 9/173* (2013.01)
USPC .................................. 219/137 WM; 219/73

(58) Field of Classification Search
USPC ................................................. 219/136, 137
See application file for complete search history.

(56) References Cited

U.S. PATENT DOCUMENTS

| 4,533,642 | A | * | 8/1985 | Kelly ............................. 436/78 |
| 4,618,405 | A | * | 10/1986 | Mohr et al. ................ 430/278.1 |
| 6,014,024 | A | | 1/2000 | Hockey et al. |
| 6,555,063 | B1 | | 4/2003 | Umezawa et al. |
| 2004/0163669 | A1 | * | 8/2004 | Brueckner et al. ............. 134/1.2 |
| 2004/0176210 | A1 | | 9/2004 | Narai et al. |

FOREIGN PATENT DOCUMENTS

| JP | 8-184537 | 12/1994 |
| JP | 9-33516 | 7/1995 |
| JP | 9-43152 | 7/1995 |
| JP | 2004-177168 | 6/2004 |

OTHER PUBLICATIONS

Surface Finishing from Ra to Rz [online], accessed via the Internet [retrieved on Apr. 6, 2009] URL: <http://xnet.rrc.mb.ca/leonf/reports/Bourget%20(SurfaceFinish_Report)/SurfaceFinish_Report.doc>.*
English equivalent by machine translation of JP 8-184537.*

* cited by examiner

*Primary Examiner* — Tu B Hoang
*Assistant Examiner* — Thien S Tran
(74) *Attorney, Agent, or Firm* — Hahn Loeser & Parks LLP

(57) ABSTRACT

A method for analyzing non-metallic inclusions in a weld metal. The method includes etching a weld bead or weld bead sample to at least partially expose a plurality of non-metal inclusions in the weld bead or weld bead sample, applying a conductive tape to and then removing the conductive tape from at least a portion of the etched weld bead or weld bead sample, and analyzing the non-metal inclusions on the conductive tape.

28 Claims, 1 Drawing Sheet

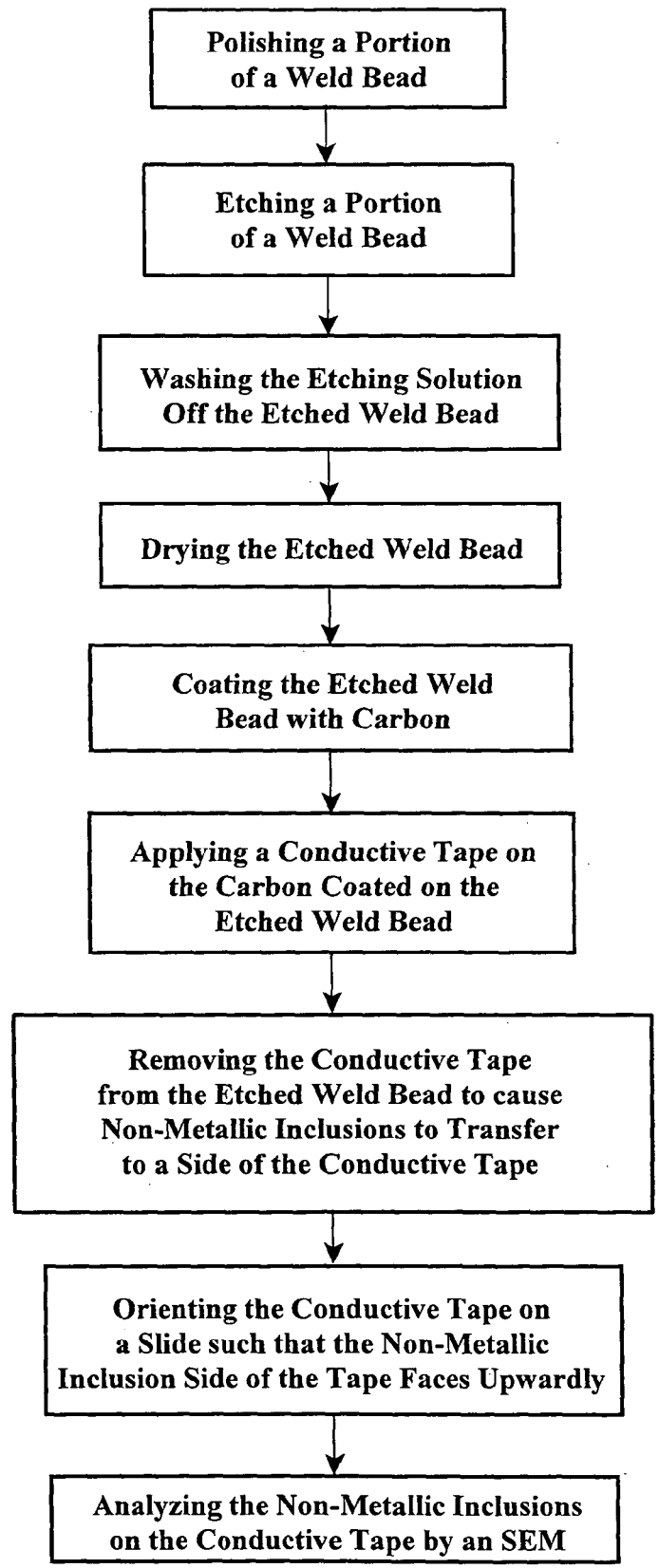

METHOD FOR EXTRACTING NON-METALLIC WELD METAL INCLUSIONS

The present invention is directed to metal analysis, and more particularly to analysis of inclusions in a metal material, even more particularly to a method for analyzing non-metal inclusions in a weld metal, and still even more particularly to a method for removing non-metallic inclusions from weld metal.

BACKGROUND OF THE INVENTION

A weld bead that is formed on a metal workpiece typically includes a number of non-metal inclusions. These non-metal inclusions can negatively interfere with the quality and strength of the weld bead. In some instances, these non-metallic inclusions can increase the incidence of fracturing of the weld bead. As a result, weld bead analysis is commonly conducted on weld bead samples to determine the quality of the formed weld bead.

There are a variety of techniques that have been used to determine the number, type and size of non-metallic inclusions in a metal material. Examples of these techniques include 1) polishing followed by microscopic analysis; 2) ultrasonic analysis; 3) X-ray analysis; 4) magnetic analysis; 5) spark discharge analysis, etc. Several of these techniques are disclosed in patent and Publication Nos. US 2004/0176210; U.S. Pat. No. 6,555,063; U.S. Pat. No. 6,014,024; JP 2004-177168; JP 9-43152; JP 9-33516; and JP 8-184537, all of which are incorporated herein by reference.

The most common technique for analyzing non-metallic inclusions in weld samples involves the extraction of such non-metallic inclusions from the weld samples. The traditional method of non-metallic inclusion extraction involves etching the weld bead with a 5% solution of nitric acid in methanol (nital), lightly coating the etched weld bead with carbon, and then electro-etching the carbon coated weld bead with a 5% solution of methanol and hydrochloric acid. During the electro-etching process, the weld metal beneath the layer of carbon is removed by the hydrochloric acid resulting in the carbon film floating to the surface of the electro-etching solution. The carbon film is caught on a copper grid for later analysis. One of the principal drawbacks of this process is that as the carbon film is caught on the copper grid, the carbon film may not be in the proper orientation on the copper grid to observe the non-metallic inclusions that have adhered to the carbon film surface. As such, when the carbon film is examined and viewed by scanning electron microscopy (SEM), the side of the carbon film that includes the non-metallic inclusions may not be properly oriented, thus imaging of the non-metallic inclusions on the carbon layer can be poor. The thickness of the carbon film can also adversely affect the images of the non-metallic inclusions on the carbon film. Other drawbacks to this method of analyzing non-metallic inclusions in weld metal are that the technique is very time consuming, and requires significant skill in handling the delicate carbon film.

In view of the current state of the art for analyzing non-metallic inclusions in weld metal, there is a need for a method that removes non-metallic inclusions from a metal material that is simpler and less time consuming, and which results in better imaging of the non-metallic inclusions.

SUMMARY OF THE INVENTION

The present invention is directed to a method for removing and analyzing non-metallic inclusions in a weld metal and will be described with particular reference thereto; however, it will be appreciated that the method of the present invention has broader applications and can be used to remove and/or analyze non-metallic inclusions in other types of metals. The method of removing and/or analyzing non-metallic inclusions in weld metal is designed to simplify the analysis process, reduce the level of skill required to remove and/or analyze the non-metallic inclusions in the weld bead, reduce the time required to remove and/or analyze the non-metallic inclusions in the weld bead, and/or produce improved imaging results of the non-metallic inclusions.

In one non-limiting aspect of the present invention, the novel method of removing and analyzing non-metallic inclusions from a weld bead includes the step of 1) etching the weld bead, 2) applying a first side of an adhering material to at least a portion of the etched weld bead, 3) removing the adhering material from the etched weld bead, and 4) analyzing the non-metal inclusions that transferred to the adhering material from the etched surface of the weld bead. This method is simpler and less time consuming than past procedures for removing and analyzing non-metallic inclusions in the weld bead. The etching step can be performed on the weld bead while the weld bead is still intact with a workpiece; however, this is not required. For instance, a sample of the weld bead can be taken from a portion of the weld bead or from a portion of a workpiece that includes a portion of the weld bead prior to the sample being subjected to etching.

In accordance with another and/or alternative aspect of the present invention, the step of etching at least a portion of the weld bead typically involves the use of an acid solution; however, other or additional types of solutions could be used to at east partially etch the weld bead. Many types of acids can be used to perform at least a portion of the etching process. The acid or combination of acids is selected to remove a portion of the metal in the weld bead while not reacting with or substantially not reacting with the non-metallic inclusions in the weld bead. In past practices, all the metal in the weld bead was dissolved by an acid. The etching process of the present invention is designed to remove or dissolve only a portion of the metal in the weld bead so as to loosen a plurality of non-metallic inclusions on the surface of the etched weld bead. The acid used in the etching solution typically includes an inorganic acid; however, organic acids can additionally or alternatively be used. In one non-limiting embodiment, the acid used in the etching solution includes perchloric acid, hydrofluoric acid, sulfuric acid, nitric acid, hydrochloric acid, phosphoric acid, and/or isobromic acid. In one particular non-limiting formulation, the acid used in the etching solution includes hydrochloric acid. In another and/or alternative particular non-limiting formulation, the acid used in the etching solution includes alcohol, acetone and/or mineral spirits. In a specific non-limiting formulation, the acid used in the etching solution includes hydrochloric acid and methanol. In still another and/or alternative particular non-limiting formulation, the etching solution includes about 1-40 percent by volume acid, typically about 2-25 percent by volume acid, and more typically about 2-15 percent by volume acid. In another and/or alternative non-limiting embodiment, the etching process is designed to remove about 0.1-20 microns of metal from the surface of the weld bead in order to at least partially expose and to substantially leave intact a plurality of non-metal inclusions on the surface of the weld bead. As can be appreciated, other amounts of metal removal from the weld bead can be achieved by the etching process. Typically, enough of the metal in the weld bead is left intact so that a plurality of non-metallic inclusions can be removed from the surface of the metal that remains after the etching process. In still another and/or alternative non-limiting embodiment, the etching process typically takes about 0.2-60 minutes; however, other time periods can be used depending on the type, concentration and temperature of the acid; and/or the amount of metal desired to be removed or dissolved by the etching solution.

In accordance with still another and/or alternative aspect of the present invention, the adhering material can be a tape material; however, it can be appreciated that other material can be used. Many types of tape can be used. The tape material can include an adhesive material on one or both sides of the tape. The tape can be an electrically conducting or non-electrically conducting tape. In one non-limiting embodiment, the tape is an electrically conductive tape. Electrically conductive tape is typically used when the non-metallic inclusions are to be analyzed by an electron microscope and/or other type of device that requires a conductive medium to image a sample. The conductive tape includes an adhesive material used to lift off loosened non-metallic inclusions on the etched surface of the weld bead. In one non-limiting aspect of this embodiment of the invention, the conductive tape is impregnated with a conductive material such as, but not limited to, carbon. In this particular aspect of the embodiment, the adhering material is applied to one or more surfaces of the etched weld bead and the adhesive material on the conductive tape causes a plurality of loosened non-metallic inclusions to transfer to the adhesive surface.

In accordance with yet another and/or alternative aspect of the present invention, at least a portion of the etched weld bead is coated with a material that is used to facilitate in the transfer of a plurality of non-metallic inclusions to the adhering material. The coating material is designed to adhere to the non-metallic inclusions that have been loosened during the etching process and to also adhere to the adhesive on the adhering material. The coating material is typically a conductive material; however, this is not required. The coating thickness of the coating material is generally about 0.01-5000 nm; however, other coating thicknesses can be used. In one non-limiting embodiment, the coating material includes a conductive material such as, but not limited to, carbon, gold and/or gold-palladium. As can be appreciated, other or additional conductive materials can be used. The coating material can be applied by a variety of techniques such as, but not limited to sputter coating, plating, and/or chemical vapor deposition (CVD) process. In one non-limiting embodiment of the invention, at least a portion of the etched weld bead is coated with carbon by a sputter coating process. Typically the sputter coating process is performed in a vacuum; however, this is not required. The thickness of the carbon coating by sputter coating is typically about 1-30 Å (angstrom); however, other thicknesses can be used.

In accordance with still yet another and/or alternative aspect of the present invention, one or more of the non-metallic inclusions on the adhering material can be analyzed by the use of one or more devices. Such devices include, but are not limited to, a light microscope, a Ramon microscope, a SEM, a Raman spectrometer, an optical spectrometer, an acoustic spectrometer, a Glow Discharge Optical Emission Spectrometer, a FTIR Spectrometer, an Infrared Spectrometer, a UV Spectrometer, an ICP-MS, an ICP-OES, and/or an atomic absorption analyzer. As can be appreciated, other or additional analyzing techniques can be used. In one embodiment of the invention, one or more of the non-metallic inclusions on the adhering material are analyzed by the use of an SEM (scanning electron microscope). In another and/or alternative embodiment of the invention, the adhering material that includes a plurality of non-metallic inclusions on at least one side of the adhering material is positioned on a substrate prior to be analyzed by one or more devices. The substrate can include, but is not limited to, a sample holder and/or a slide. As can be appreciated, other or additional substrates can be used. In still another and/or alternative embodiment of the invention, the adhering material that includes a plurality of non-metallic inclusions on at least one side of the adhering material is positioned such that at least one side including a plurality of non-metallic inclusions faces upwardly so as to facilitate in the analysis and/or imaging of the non-metallic inclusions.

In accordance with a further and/or alternative aspect of the present invention, the etched weld bead can be washed and/or dried prior to a plurality of the non-metallic inclusions being removed from the etched weld bead by the adhering material; however, this is not required. In one non-limiting embodiment of the invention, at least a portion of the weld bead is washed prior to and/or after being etched. The washing process, when used, is designed to 1) remove foreign substances (e.g., dirt, oil, etc.) from at least a portion of the weld bead so as to facilitate in the etching of the weld bead, and/or remove the etching solution from the weld bead after the completion of the etching process. As can be appreciated, the washing process can have other or additional functions. Many types of liquids can be used to at least partially wash the weld bead. Non-limiting examples of such liquids include, but are not limited to, alcohol, water, acetone, and/or mineral spirits. In a specific non-limiting example, an alcohol such as, but not limited to, methanol forms at least a portion of the liquid used to wash the weld bead. In another and/or alternative non-limiting embodiment of the invention, the weld bead is at least partially dried after a washing process and/or etching process. In another and/or alternative non-limiting embodiment of the invention, the weld bead is dried prior to the non-metallic inclusions being removed from the weld bead. In one non-limiting aspect of this embodiment, the drying of the weld bead can be at least partially accomplished by a convection heating system (e.g., oven, blown heated air, etc.), and/or a radiation heating system.

In accordance with still a further and/or alternative aspect of the present invention, the weld bead can be at least partially pre-treated prior to being etched; however, this is not required. Such pre-treatment processes can include, but are not limited to, cleaning at least a portion of the surface of the weld bead, polishing at least a portion of the weld bead, etc. In one non-limiting embodiment of the invention, at last a portion of the weld bead is polished prior to being etched. The polishing process facilitates in preparing a more uniform surface for the etching process. The polishing process can also result in some cleaning of the surface of the weld bead to also facilitate in the etching process. In one aspect of this embodiment, the polishing of the weld bead sample results in the formation of about a 0.1-5 micron finish on a polished surface of the weld bead. As can be appreciated, other degrees of polishing can be formed by the polishing process. In another and/or alternative aspect of this embodiment, the polishing of the weld bead can be at least partially accomplished by mechanical polishing techniques and/or electropolishing techniques.

In accordance with yet a further and/or alternative aspect of the present invention, the adhering material can be coated with a conductive material after a plurality of non-metallic inclusions have been transferred to one or more surfaces of the adhering material. The coating of the adhering material with a conductive material is used to improve the imaging of the non-metallic inclusions on the adhering material such as by an electron microscope and/or other type of device that requires a conductive medium to image a sample. The coating thickness of the coating material is generally about 0.01-5000 nm; however, other coating thickness can be used. In one non-limiting embodiment, the coating material includes a conductive material such as, but not limited to, carbon, gold and/or gold-palladium. As can be appreciated, other or additional conductive materials can be used. The coating material can be applied by a variety of techniques such as, but not limited to sputter coating, plating, and/or chemical vapor deposition (CVD) process. In one non-limiting embodiment of the invention, at least a portion of the etched weld bead is coated with carbon by a sputter coating process. Typically the sputter coating process is performed in a vacuum; however, this is not required. The thickness of the carbon coating by sputter coating is typically about 1-30 Å (angstrom); however, other thicknesses can be used.

It is one non-limiting object of the present invention to provide an improved method and process for removing and/or analyzing non-metallic inclusions in a metal material such as, but not limited to, weld metal.

It is another and/or alternative non-limiting object of the present invention to provide an improved method and process for removing and/or analyzing non-metallic inclusions in a metal material that is simpler and/or less time consuming.

It is still another and/or alternative non-limiting object of the present invention to provide an improved method and process for removing and/or analyzing non-metallic inclusions in a metal material that better positions the non-metallic inclusions on a substrate so as to improve the imaging of the non-metallic inclusions.

These and other advantages will become apparent to those skilled in the art upon the reading and following of this description taken together with the accompanying drawings.

BRIEF DESCRIPTION OF THE DRAWING

Reference may now be made to the drawing, which illustrates an embodiment that the invention may take in physical form wherein:

FIG. 1 is a flow chart of one non-limiting method of removing and analyzing non-metallic inclusions from a weld bead in accordance with the present invention.

DETAILED DESCRIPTION OF THE INVENTION

Referring now to the drawing wherein the showing is for the purpose of illustrating one non-limiting embodiment of the invention only and not for the purpose of limiting the same, FIG. 1 illustrates a process and method for removing and analyzing non-metallic inclusions in a weld bead in accordance with the present invention. The method of the present invention includes four (4) important steps namely, a) etching the weld bead, b) applying a first side of an adhering material to at least a portion of the etched weld bead, c) removing the adhering material from the etched weld bead, and d) analyzing the non-metal inclusions that transferred to the adhering material from the etched surface of the weld bead. The other process and method steps illustrated in FIG. 1 are variations of one or more of these four steps or are additional steps that can be used in accordance with the present invention.

Referring again to FIG. 1, the weld bead or a portion of a weld bead can be polished to prepare the surface of the weld bead prior to the etching step. The polishing step is an optional step. The polishing step can be used to clean at least a portion of the surface of the weld bead and/or to form a more uniform surface on the surface of the weld bead for the etching process. When the weld bead is polished, a 0.2-2 micron finish is typically formed, and more particularly about a one micron polished finished is formed. The polishing of the weld bead is typically accomplished by mechanical polishing techniques; however, other or additional polishing techniques can be used. The weld bead can be washed with a solvent and/or cleaning solution prior to, during and/or after the polishing process to facilitate in cleaning and preparing the surface of the weld bead for the etching process. This washing process is an optional process. When the weld bead is washed, the solvent and/or cleaning solution is typically selected so as to not oxidize the metal of weld bead. Non-limiting examples of materials that can be included in the solvent and/or cleaning solution include alcohol, acetone, and/or mineral spirits. If the weld bead is washed, the weld bead can be dried.

Once the weld bead has been pre-treated, if such pretreatment process is used, the weld bead is etched by an etching solution. The etching process is designed to remove or dissolve a portion of the metal of the weld bead so as to loosen a plurality of non-metallic inclusions at or near the surface of the weld bead. The step of etching at least a portion of the weld bead typically involves the use of an etching solution that includes an acid solution. Many types of acids and/or combinations of acids can be used to perform at least a portion of the etching process. The combination of the etching solution is selected to remove a portion of the metal in the weld bead while not reacting with or substantially not reacting with the non-metallic inclusions in the weld bead. One non-limiting formulation of the etching solution includes hydrochloric acid and methanol. The concentration of hydrochloric acid in this etching solution is about 2-20 percent by volume acid, and more typically about 2-10 percent by volume acid, and even more typically about 4-6 percent by volume acid. The etching process typically removes about 0.5-10 microns of metal from the surface of the weld bead in order to expose and to substantially leave intact a plurality of non-metal inclusions on the surface of the weld bead. The etching process typically takes about 1-10 minutes; however, other time periods can be used.

After the weld bead has been etched, the weld bead can be washed; however, this is not required. The washing of the weld bead is designed to remove the etching solution from the weld bead so as to terminate further etching of the weld bead. The washing of the weld bead can also be used to remove other or additional undesirable substances from the etched weld bead (e.g., dirt, etc.). Many types of liquids can be used to at least partially wash the weld bead. One non-limiting example of such a liquid includes an alcohol such as methanol. During the washing process, the weld bead is gently washed so as to minimize the number of loose non-metallic inclusions that are removed from the weld bead during the washing process. After the weld bead has been washed, the weld bead is typically dried. When the weld bead is dried, the drying of the weld bead can be at least partially accomplished by a convection heating system such as passing warm air over the surface of the washed weld bead.

The next step illustrated in FIG. 1 is a process of coating the etched weld bead with a conductive material such as carbon. The carbon is coated on the etched surface of the weld bead so as to 1) at least partially bond to the loosened non-metallic inclusions so as to facilitate in the removal of the non-metallic inclusions from the etched weld bead, and/or 2) improve the imaging of the non-metallic inclusions. The carbon layer is applied by a sputter coating process in a vacuum environment. The coating thickness of the carbon layer is typically about 1-10 Å.

After the carbon is coated onto the etched weld bead, a first side of an electrically conductive tape that includes an adhesive material is applied to the carbon layer on the etched weld bead. The conductive tape can include a conductive material such as carbon impregnated in the tape. After the conductive tape has been applied to the etched weld bead, the conductive tape is removed from the weld bead and a first side of the conductive tape now includes both carbon and a plurality of non-metallic inclusions that were formerly on the etched surface of the weld bead.

The removed conductive tape can be further treated (e.g., coated with a conductive material, etc.) or immediately placed on a substrate such as a sample holder or slide. The conductive tape is positioned on the substrates such that the first side of the conductive tape faces upwardly. This orientation of the first side of the tape facilitates in ensuring that the extracted non-metallic inclusions will be properly oriented so that direct observation of the morphology and/or determination of the composition of the non-metallic inclusions can be better achieved. Analysis of the non-metallic inclusions can be accomplished by one or more devices and/or analytical techniques (e.g., chemical analysis, etc.). One device that can be used is a SEM (scanning electron microscope).

The method set forth in FIG. 1 shortens the time necessary to remove and analyze non-metallic inclusions in a weld bead as compared with past analysis techniques. The method as set forth in FIG. 1 also insures that the sample of non-metallic inclusions taken from the etched weld bead will be properly oriented for analyses, thus overcoming a significant shortcoming of past analysis procedures.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to a preferred embodiment. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

I claim:

1. A method for analyzing non-metallic inclusions in a weld metal comprising:
   a) etching said weld bead or weld bead sample;
   b) applying a first side of an adhering material to at least a portion of said etched weld bead or weld bead sample;
   c) removing said adhering material from said etched weld bead or weld bead sample, said first side of said adhering material including a plurality of non-metal inclusions that were formerly on said etched weld bead or weld bead sample; and,
   d) analyzing said non-metal inclusions on said adhering material.

2. The method as defined in claim 1, wherein said step of etching includes the use of an acid solution.

3. The method as defined in claim 2, wherein said acid solution is substantially non-reactive to a majority of said non-metallic inclusions in said weld bead or weld bead sample.

4. The method as defined in claim 2, wherein said acid solution includes perchloric acid, hydrofluoric acid, sulfuric acid, nitric acid, hydrochloric acid, phosphoric acid, isobromic acid, or combinations thereof.

5. The method as defined in claim 4, wherein said acid solution includes hydrochloric acid and methanol.

6. The method as defined in claim 4, wherein said acid solution includes about 2-15 percent by volume hydrochloric acid.

7. The method as defined in claim 1, wherein said etching step reduces a thickness of said weld bead or weld bead sample by about 1-20 microns and exposing and substantially leaving intact a plurality of said non-metal inclusions on a surface of said weld bead or weld bead sample.

8. The method as defined in claim 1, wherein said adhering material is a conductive tape.

9. The method as defined in claim 1, wherein said step of analyzing said non-metal inclusions on said adhering material includes use of a device selected from the group consisting of a light microscope, a Ramon microscope, a SEM, a Raman spectrometer, an optical spectrometer, an acoustic spectrometer, a Glow Discharge Optical Emission Spectrometer, a FTIR Spectrometer, an Infrared Spectrometer, a UV Spectrometer, an ICP-MS, an ICP-OES, an atomic absorption analyzer, and combinations thereof.

10. The method as defined in claim 1, including the step of polishing at least a portion of a weld bead or sample of a weld bead prior to said etching step.

11. The method as defined in claim 10, wherein said polishing step includes forming about a 0.1-2 micron finish on a top surface of said weld bead or weld bead sample.

12. The method as defined in claim 10, wherein said polishing step includes mechanical polishing, electropolishing or combinations thereof.

13. The method as defined in claim 1, including the step of washing said etched weld bead or weld bead sample to at least partially remove residual etching solution on weld bead or weld bead sample.

14. The method as defined in claim 13, wherein said step of washing includes the use of a washing fluid, said washing fluid including a liquid selected from the group consisting of an alcohol, water, acetone, mineral spirits, or combinations thereof.

15. The method as defined in claim 1, including the step of at least partially drying said etched weld bead or weld bead sample.

16. The method as defined in claim 15, wherein said drying step includes the exposing of a surface of said weld bead or weld bead sample to a convection heating system, a radiation heating system, or combinations thereof.

17. The method as defined in claim 1, including the step of at least partially coating said etched weld bead or weld bead sample with a conductive material.

18. The method as defined in claim 17, wherein said conductive material includes carbon, gold, gold-palladium, or combinations thereof.

19. The method as defined in claim 17, wherein said conductive material has a coating thickness of about 1-50 Å.

20. The method as defined in claim 17, including the step of applying said adhering material to at least a portion of said conductive material coated on said weld bead or weld bead sample to transfer at least a portion of said conductive material and said non-metallic inclusions to said adhering material.

21. The method as defined in claim 1, including the step of orienting said adhering material on a substrate prior to analyzing said non-metal inclusions such that said first side of said adhering material is facing upwardly on said substrate.

22. The method as defined in claim 21, wherein said substrate includes a sample holder or a slide.

23. A method for analyzing non-metallic inclusions in a weld metal comprising:
   a) polishing at least a portion of a weld bead or sample of a weld bead;
   b) etching said polished weld bead or weld bead sample in an acid solution, said acid solution substantially non-reactive to a majority of said non-metallic inclusions in said weld bead or weld bead sample;
   c) washing said etched weld bead or weld bead sample to at least partially remove residual etching solution on weld bead or weld bead sample;
   d) at least partially drying said etched weld bead or weld bead sample;
   e) at least partially coating said etched weld bead or weld bead sample with a conductive material;
   f) applying a first side of a conductive tape to at least a portion of said conductive material coated on said etched weld bead or weld bead sample;
   g) removing said conductive tape from said conductive material coated on said etched weld bead or weld bead sample, said first side of said conductive tape including a plurality of non-metal inclusions that were formerly on said etched weld bead or weld bead sample;
   h) orienting said conductive tape on a substrate such that said first side of said conductive tape is placed facing upwardly; and,
   i) analyzing said non-metal inclusions on said conductive tape.

24. The method as defined in claim 23, wherein said polishing step includes forming about a 0.1-2 micron finish on a top surface of said weld bead or weld bead sample.

25. The method as defined in claim 23, wherein said acid solution includes hydrochloric acid and methanol, acid solution including about 2-15 percent by volume hydrochloric acid.

26. The method as defined in claim 23, wherein said conductive material includes carbon.

27. The method as defined in claim 26, wherein said conductive material is at least partially applied to said etched weld bead by sputter coating.

28. The method as defined in claim 23, wherein said step of analyzing includes use of a SEM.

\* \* \* \* \*